Fig. 1.

Aug. 7, 1962 R. W. TAYLOR 3,048,751
ARRANGEMENTS FOR CONTROLLING THE LENGTHS
INTO WHICH FED MATERIAL IS CUT
Filed Dec. 24, 1958 7 Sheets-Sheet 2

Fig.2.

INVENTOR
Ronald W. Taylor
BY
Ralph B. Stewart
ATTORNEY

Fig. 7.

United States Patent Office 3,048,751
Patented Aug. 7, 1962

3,048,751
ARRANGEMENTS FOR CONTROLLING THE LENGTHS INTO WHICH FED MATERIAL IS CUT
Ronald William Taylor, Stevenage, England, assignor to A. C. Cossor Limited, London, England, a British company
Filed Dec. 24, 1958, Ser. No. 782,847
Claims priority, application Great Britain Jan. 1, 1958
12 Claims. (Cl. 318—11)

The present invention relates to machines for cutting fed material into lengths and to improved means for controlling these lengths.

Such machines include means for feeding material past a cutting device, such as a guillotine, and variations in either the speed of the feed or the speed of operation of the cutting device result in variations in the lengths of material cut.

The present invention has for its principal object to provide improved means for maintaining the cut length substantially at a predetermined value.

According to the present invention there is provided a machine for cutting fed material into lengths, comprising driving means for feeding the material, cutting means arranged to effect repetitive cutting operations upon the fed material, and a control mechanism which comprises means for generating two trains of electrical pulses, the pulses of one train having a duration dependent upon the time interval between successive cutting operations and those of the other train a duration dependent upon the desired movement of the driving means between successive cutting operations, the pulses of the two trains having coincident front or back edges, means for combining the trains to generate control pulses and means for applying the control pulses to vary the speed of the driving means relative to the speed of the cutting means.

The pulses of the said other train may be generated by means of count pulses which in turn are generated at a repetition frequency dependent upon the speed of the driving means, a pulse of the said other train having its front edge determined by the cutting means and its duration determined by a counter arranged to count a predetermined number of the said count pulses. The said predetermined number may be adjustable.

The interval between two successive cutting operations may be used to derive the said control pulses and the control pulses applied to vary the said speed during the next such interval. If desired two of the control mechanisms may be provided operating alternately to generate the control pulses and to apply the pulses to vary the speed.

In a preferred arrangement there are provided two control channels, one adapted when actuated to increase the cut length and the other adapted when actuated to decrease the cut length, the said combining means generating control pulses of opposite sign in response to the cut length exceeding and being less than the desired value, and means being provided for applying control pulses of opposite sign to the two channels respectively to actuate such channels. The control pulses may have a duration dependent upon the extent of the error in the cut length and may be arranged to energise a motor which varies the gear ratio of a mechanical coupling, for instance that between the cutting means and a motor driving the cutting means, the extent of the change in gear ratio being thus dependent upon the extent of the error.

In order that the control pulses may operate with an accuracy substantially independent of the speed of movement of the material, pulses generated by the said combining means are preferably used to gate pulses from the source of the aforesaid count pulses, the said gear ratio being varied in dependence upon the number of count pulses occurring during a gating pulse.

The invention will be described, by way of example, with reference to the accompanying drawings in which.

Figure 2:
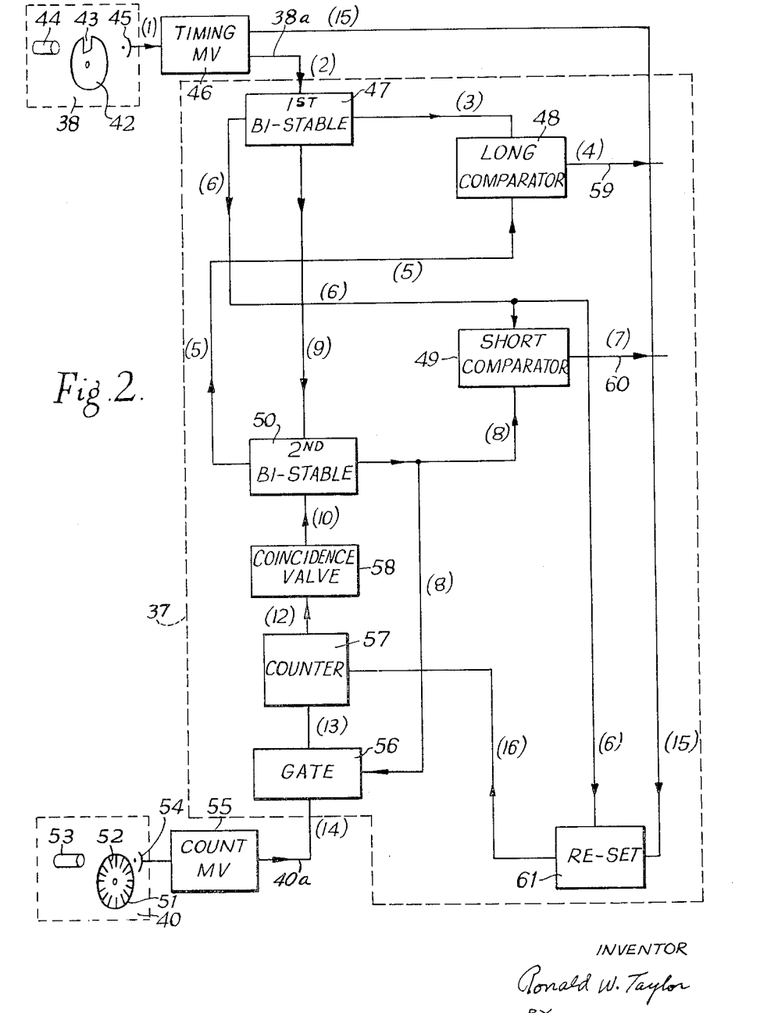
FIGS. 2 and 3 are block diagrams of two parts of the embodiment in greater detail, FIGS. 4 and 5 contain waveform diagrams of waveforms appearing in FIGS. 2 and 3 respectively.
Figure 3:
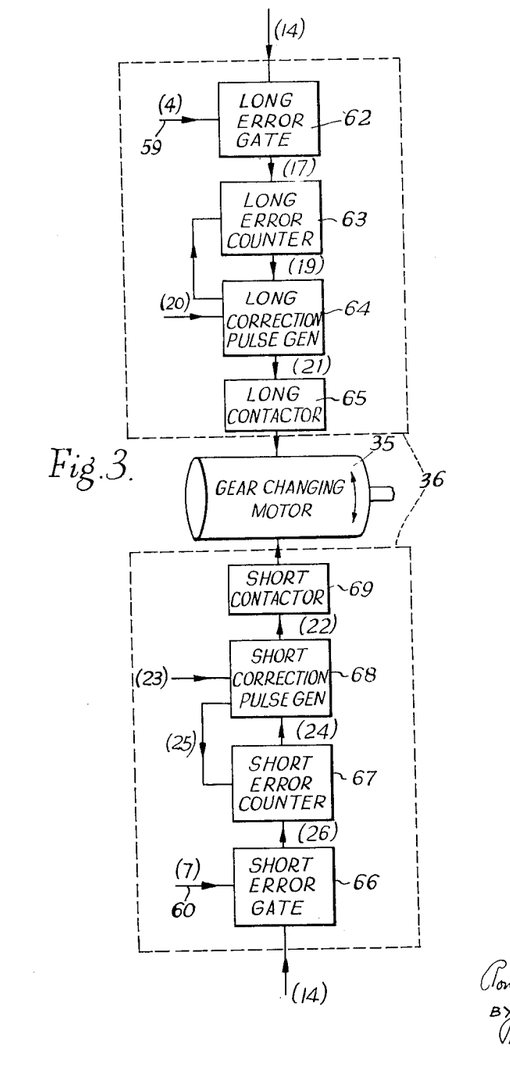
Figure 4:
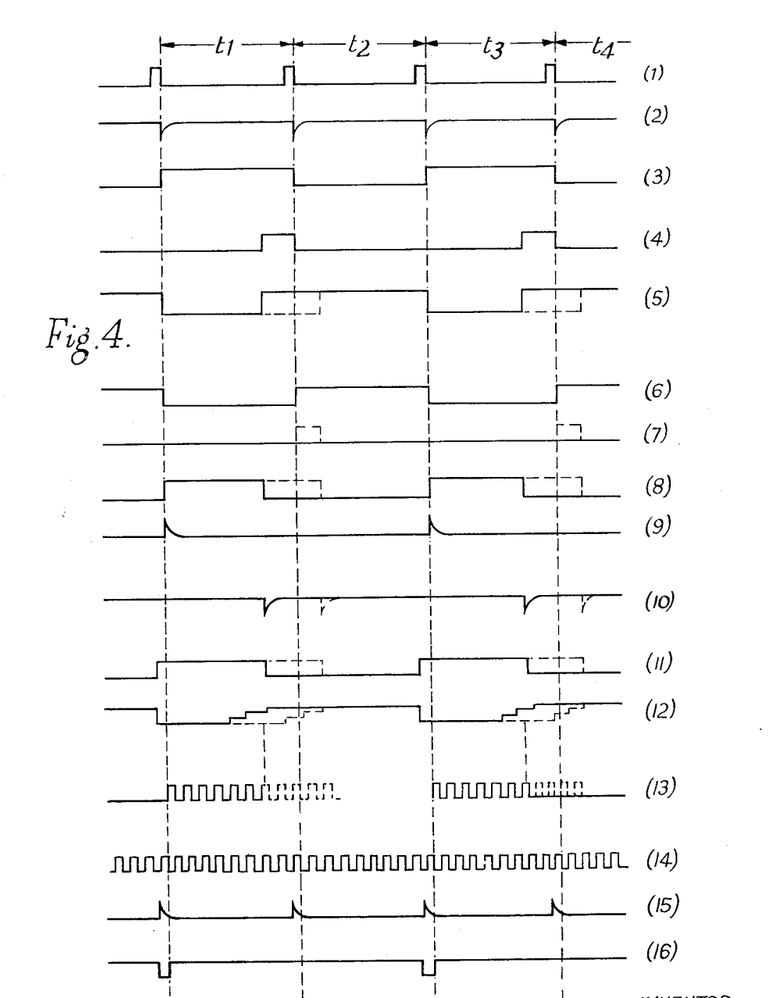
Figure 5:
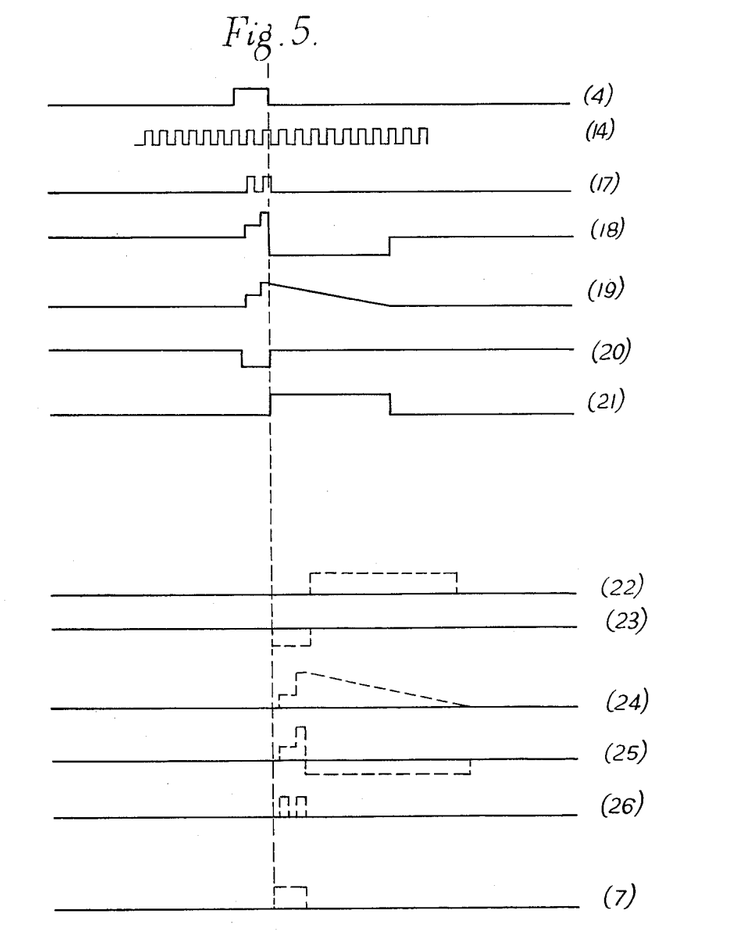

In FIGS. 4 and 5 the various waveforms are identified by bracketed numerals which appear in FIGS. 2, 3, 6 and 7 at the points where they occur. Waveforms (4), (7) and (14) of FIG. 4 are repeated in FIG. 5 in order to correlate these two figures.

The embodiment to be described is for cutting corrugated cardboard at high speed into lengths, the length being adjustable and being maintained accurate automatically to close tolerances.

Figure 1:
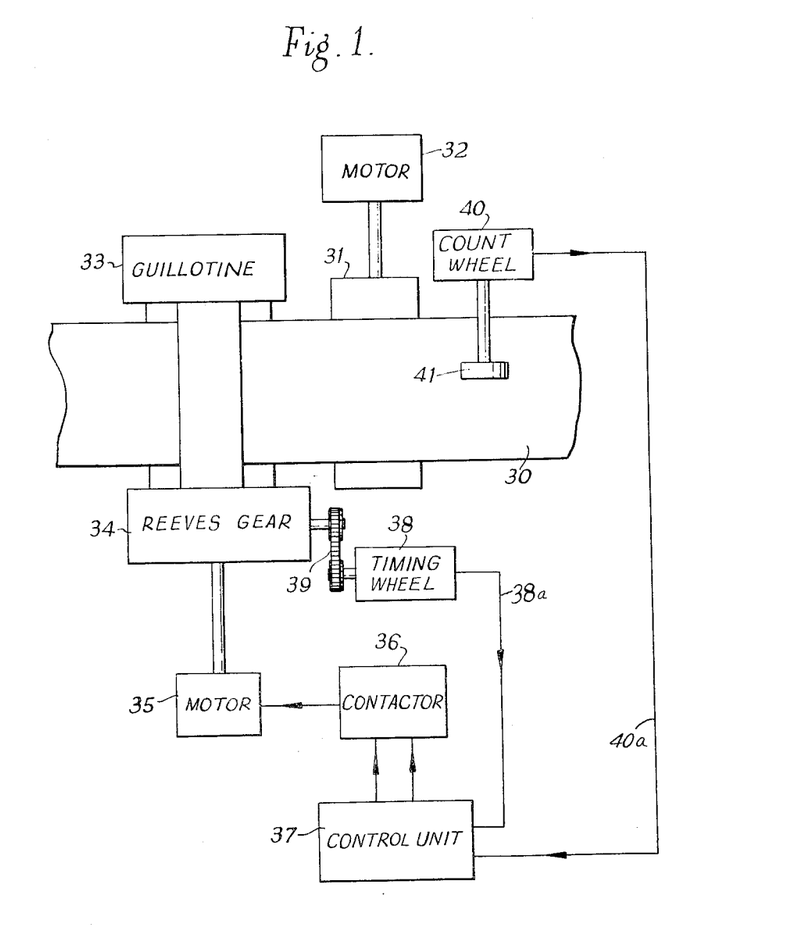
FIG. 1 is a block diagram of one embodiment of the invention.

In FIG. 1 a sheet 30 of cardboard is shown diagrammatically as being driven by a roller 31 driven by a motor 32. In practice the cardboard may be fed directly from the machine in which it is made to the machine according to the present invention in which case the motor 32 is unnecessary.

The cardboard passes beneath the rotary cutter of a guillotine 33 of known type which is driven by a motor (not shown) the speed of the guillotine being controlled by a Reeves variable speed gear 34. As is well-known this gear comprises a V belt running between V pulleys, the distance between the flanges of the pulleys being variable. The gear ratio of the Reeves gear is variable by means of a reversible motor 35. Hitherto the motor 35 has been controlled by means of a manually operated contactor 36, but in the machine to be described the contactor is controlled automatically by a control unit 37 under the influence of two trains of pulses, one train of which (referred to as timing pulses) is derived from a timing wheel, 38 driven by a chain drive 39 from the guillotine shaft and supplied to control unit 37 over connection 38a, while the other train (referred to as count pulses) is derived from a count wheel 40 driven by a rubber-covered roller 41 bearing upon the surface of the cardboard 30 and is supplied to unit 37 over connection 40a. Thus the timing pulses from 38 have a recurrence frequency dependent upon the speed of the guillotine and the count pulses from 40 have a recurrence frequency dependent upon the speed of the cardboard 30.

Referring now to FIG. 2, the timing wheel 38 is shown within a dotted rectangle and comprises a wheel 42 having a slot 43 arranged to rotate in the light path between a light source 44 and a photo-electric cell 45. Timing pulses as shown in FIG. 4 in waveform (1) are generated, one pulse for every cut made by the guillotine. These pulses are applied to a multivibrator or Schmitt trigger circuit 46 which at one of its two outputs generates pulses (2) which are coincident with the back edges of the pulses (1) and are fed by connection 38a to a first bi-stable device 47. Two of the outputs of this device are the waveforms (3) and (6) which are of like shape but opposite sign.

Each of the waveforms (3) and (6) generated by the bi-stable device 47 consists of positive-going and negative-going pulses having their front and back edges coincident with the back edge of the timing pulses (1) and the duration of each such pulse is equal to the time interval between successive cutting operations. These pulses (3) and (6) are therefore referred to as cut-length pulses. It is, of course, not essential that the front and back edges of the pulses should be coincident with the back edges of the pulses (1) so long as the duration of the pulses is as stated.

Separate control signals are generated according as the cut length is greater or less than the desired length, referred to as the set length. One of the sets of cut-length pulses, namely (3), is used when the cut-length is too great, and the other set, namely (6), when the cut length is too small.

The pulses (3) are fed to a "long" comparator 48 (for developing a control signal when the cut-length is too long) and the pulses (6) are fed to a "short" comparator 49. Pulses (9) (derived by differentiation and amplitude selection from the pulses (3) in the first bi-stable device) are fed to a second bi-stable device 50 and serve to trigger this device on, thus producing the negative-going edges of a waveform (5) and the positive-going edges of a waveform (8). The other edges of these waveforms (and therefore the durations of the pulses) are determined, as will be described hereinafter, in dependence upon the set length.

The count wheel 40 of FIG. 1 is shown within a dotted rectangle in FIG. 2 and comprises a wheel 51 having radial slots 52 arranged to rotate in the light path between a light source 53 and a photo-electric cell 54. The count pulses so generated are fed to a multivibrator 55 the output of which consists of count pulses (14). The count pulses, in this example, recur ever 1/10 inch movement of the cardboard 30 (FIG. 1). The count pulses are applied by connection 40a to a gate 56 which is controlled by the waveform (8) and is open when that waveform is positive. The count pulses (14) occurring while the gate 56 is open pass to a counter 57 which, as will be described in more detail later, consists of four decade counters in cascade, counting respectively in units of 1/10, 1, 10 and 100 inches. The desired set length is set on the four counters (as will be described later), and when a count equal to this set length is reached on each counter a positive voltage is applied to a coincidence valve 58. Only when all four positive voltages are applied simultaneously to the valve 58 does this valve operate to generate a trigger pulse (10). The progressively increasing voltage fed to the valve 58 is shown in waveform (12). Waveform (11) is the output of the coincidence valve which is differentiated to produce trigger pulses (10). The pulses (10) serve to switch the second bi-stable device 50 off. The effect of switching the device 50 off is also to close the gate 56 and stop the feeding of count pulses to the counter 57.

In the waveform diagrams of FIGS. 4 and 5 the waveforms present when the cut length is too great are shown in full lines and those when the cut length is too small in dotted lines.

The waveforms (3) and (5) are compared in the "long" comparator 48 and the waveforms (6) and (8) are compared in the "short" comparator 49. These comparators are in the form of "and" gates and produce an output only when the waveforms applied thereto are simultaneously positive. On examining the waveforms (3) and (5) and (6) and (8) it will be seen that an output is produced by 48 only when the cut length is too great and an output is produced by 49 only when the cut length is too small.

An excessive cut length results in an output at 59 from the "long" comparator 48 in the form of a pulse (4) whose duration is a measure of the excess in length. Similarly a deficiency in cut length results in an output at 60 in the form of a pulse (7) whose duration is a measure of the deficiency in length. The way in which these pulses are used to generate control pulses will be described later. The pulse in waveform (4) or (7) occurring immediately before or immediately after the end of the interval $t_1$ (waveform (1) FIG. 4) is used to vary the gear ratio of the gear 34 (FIG. 1) during the interval $t_2$. The next control pulse is generated during the interval $t_3$ and is used for control purposes during the interval $t_4$.

It is necessary to re-set the counter 57 and the best time to do this is just before each count commences, that is just before the front edges of the gating pulses (8). The waveform (1) is therefore differentiated in the multivibrator 46 and the positive spikes are selected as shown at (15). These are coincident with the front edges of the pulses (1) and therefore occur at the correct times. These pulses (15) are fed to a re-set device 61 which transmits re-set pulses (16) to the counter 57. In order to ensure that re-set does not occur whilst a cut-length pulse (3) or (6) is positive, a pulse (6) is fed from the first bi-stable device 47 to gate the re-set device 61.

Turning now to FIGS. 3 and 5, the waveform (4) is fed from lead 59 in FIG. 2 to a long error gate 62 which is also supplied with count pulses (14). The output (17) of the gate, therefore, consists of a number of count pulses proportional to the "long" error (if any). These pulses are fed to a counter 63 which generates and stores in a capacitor, a voltage (19) proportional to the number of pulses and hence to the "long" error in tenths of an inch. This counter will be described in more detail later.

The voltage (19) is applied to a correction pulse generator 64 which comprises a thyratron, the voltage (19) being applied to the control grid and the waveform (20) (which is the waveform (4) inverted) being applied to a second grid. The negative pulse (20) prevents the thyratron from conducting throughout its duration. At the end of the pulse (20) the thyratron conducts and passes a pulse (21) to a contactor 65, actuation of which is arranged to drive the motor 35 in one direction and therefore to change the Reeves gear ratio in one sense. The length of the pulse 21 is proportional to the voltage on the capacitor when the thyratron began to conduct and hence to the "long" error. The motor 35 is therefore driven for a time dependent upon the "long" error and produces a change in gear ratio proportional to the "long" error.

The "short" error correction is effected in a similar way. Thus the waveform (7) is applied on line 60 to a short error gate 66 together with count pulses (14). The output (26) is fed to a counter 67 which supplies a voltage (24) proportional to the "short" error to a pulse generator 68, corresponding to 64, fed also with the waveform (23) which is the inverse of the waveform (7). The output (22) is fed to a short error contactor 69 actuation of which is arranged to rotate the motor 35 in a sense opposite to that produced by actuation of the contactor 65. The contactors 65 and 69 form parts of the contactor 36 in FIG. 1.

Figure 6:
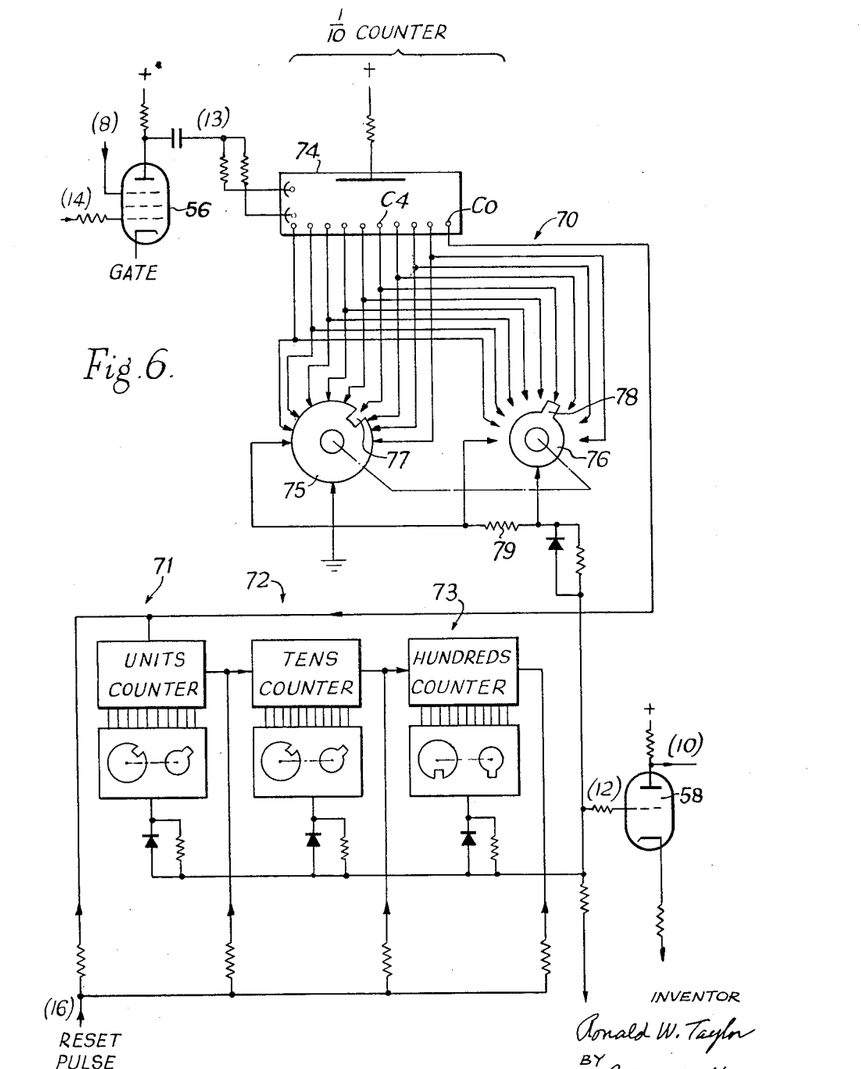
FIGS. 6 and 7 show certain parts of FIGS. 2 and 3 in still greater detail.

The counter 57 of FIG. 2 will now be described in more detail with reference to FIG. 6. Pulses (13) from the gate 56 are fed to a four-stage counter comprising four tubes such as are sold under the registered trademark "Dekatron." The first stage 70 will be described in detail and the other stages 71, 72 and 73 are represented by blocks but each is constructed and connected in the same way as the stage 70. The stage 70 is arranged to count the pulses in units (one step in the counter for every pulse) and is therefore the 1/10 inch counter. The other counters 71, 72 and 73 are the 1 inch, 10 inch and 100 inch counters respectively. Thus the counter, in this example, is arranged to count up to 999.9 inches.

The counter 70 comprises a "Dekatron" 74 and two ganged switches 75 and 76 connected as shown to the ten cathodes of the "Dekatron," which, as is known, are arranged in a ring. The switch 75 has a conducting member provided with a slot 77 and the switch 76 has a conducting member provided with a projecting lug 78 cooperating with a contact connected to the same cathode as that connected to the contact opposite the slot 77. The switches of the four counters are set to the desired cut length by setting the slot and lug of the four counters to the positions corresponding to the tenths, units, tens and hundreds numerals of the desired length in inches and tenths of an inch.

What has to be counted in each counting interval is the number of count pulses in one group in the waveform (13) of FIG. 4. At the commencement of the count the glow rests upon the zero cathode $C_0$ of each "Dekatron." When the first pulse arrives at the counter 70, it causes the glow to step on from the cathode $C_0$ to the next adjacent cathode. Each succeeding pulse causes the glow to step on to the next cathode until, at the tenth pulse it reaches the cathode $C_0$ again. When this happens, a pulse is fed from this cathode $C_0$ through a coupling valve (not shown) to the units counter 71 in which it causes the glow to step on from its zero cathode to the next cathode. As further pulses (13) arrive, the counter 70 continues to count and at every tenth pulse the units counter is stepped forward by one step. When the units counter has moved forward by ten steps, its glow has returned to its zero cathode and a pulse is applied through a coupling valve (not shown) to the tens counter 72 whose glow is moved forward by one step. The same procedure is followed by the hundreds counter 73.

During the counting process described, each time the glow rests on a selected cathode, that is a cathode connected to the switch contact opposite the slot 77 and lug 78, a positive pulse is generated across a resistor 79 and is fed to the control grid of the coincidence valve. This valve is so biased that it remains non-conducting in its anode circuit unless the voltage applied to its control grid is equal to that of four of the said pulses. Thus it is only when the four counters all reach the state in which the glows in all are simultaneously on the selected cathodes that the valve 58 conducts.

The re-set pulses (16) are fed to the zero cathodes $C_0$ of all four counters.

Figure 7:
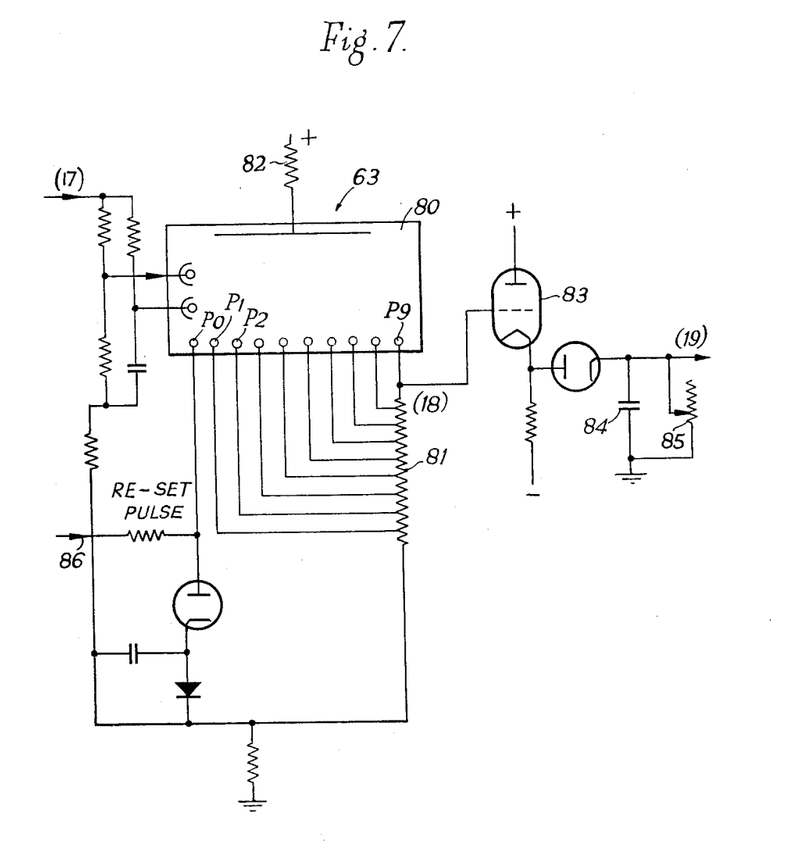

FIG. 7 shows the counter 63 of FIG. 3 which also comprises a "Dekatron" 80. The counter 67 is similar and will not be described separately.

The glow rests initially on the cathode $P_0$. All the remaining cathodes are connected to equally spaced tappings on a load resistor 81; the resistance between taps may be 15 kilo-ohms. Thus when the glow is on cathode $P_1$ the load is 15 kilo-ohms, when on cathode $P_2$ 30 kilo-ohms, and so on. The values of the resistances between taps on 81 may, if desired, be made different from one another and such as to give the required speed/time characteristic to the gear change. The anode load 82 is made high and the cathode current is therefore approximately constant irrespective of the cathode load. The voltage at the cathode $P_9$ is therefore proportional to the number of steps that the glow has made from the cathode $P_0$ and hence to the number of pulses (17) counted. This voltage is applied through a cathode-follower 83 to charge a capacitor 84, the charge leaking away at a rate determined by the setting of a leak resistor 85. The waveform (19) is thus generated across the capacitor. Suitable re-set pulses are applied at 86 to return the glow to the cathode $P_0$ before the commencement of each interval during which counting is required.

I claim:

1. Apparatus for maintaining the movement of a first member in a predetermined relation to the movement of a second member, said apparatus comprising means for generating two trains of pulses including means for determining the durations of the pulses of said two trains in proportion to the rates of movement of said two members respectively, the pulses of said two trains having one of their edges substantially coincident, control pulse generating means controlled by said two trains to generate control pulses in response to changes in relative duration of the pulses in said two trains of pulses, speed control means controlling the relative speed between said first and second member, and means controlling the operation of said speed control means by said control pulses to vary the said relative speed in a sense tending to maintain said predetermined relation.

2. Apparatus according to claim 1 comprising means for adjusting the rate of movement of one member to vary said predetermined relation.

3. Apparatus according to claim 1 wherein said control pulse generating means includes means combining the pulses of said first and second trains to produce said control pulses during time overlap between the pulses of said two trains, whereby the duration of the control pulses is equal to the difference between the durations of the pulses in said two trains.

4. Apparatus according to claim 1 wherein the pulses of said trains are substantially coincident at their leading edges and further comprising a count pulse generator forming part of said duration determining means for one of said trains, means coupling said first member to said count pulse generator to control the repetition frequency of said count pulses in proportion to the speed of said first member, a pulse counter generating a triggering pulse when a predetermined number of pulses has been counted, means supplying pulses from said count pulse generator to said pulse counter, and means embodied in said pulse generating means and controlled by said triggering pulse for determining the trailing edge of the pulses in one of said tranis.

5. Apparatus according to claim 4 comprising means for adjusting said pulse counter to vary said predetermined number of pulses counted by the counter and thereby to vary the duration of the pulses in said one train.

6. Apparatus according to claim 1 comprising two control channels coupling said control pulse generating means to said speed control means, one of said channels including means when actuated to increase the speed of said first member relatively to that of said second member, and the other of said channels including means when actuated to decrease the speed of said first member relatively to that of said second member, said control pulse generating means generating control pulses of one sign in response to the pulse duration of one train exceeding that of the other and of opposite sign when the pulse duration is less than that of the other train, and said channels being selectively actuated in response to control pulses of a predetermined sign.

7. Apparatus for maintaining the movement of a first member in a predetermined relation to the movement of a second member, said apparatus comprising first pulse generating means, means coupling said first member to said pulse generating means to determine the duration of the pulses from said generating means in proportion to the speed of said first member, second pulse generating means, means coupling said second pulse generating means to said first pulse generating means to maintain one edge of the pulses from said second pulse generating means substantially coincident with one edge of the pulses from said first pulse generating means, pulse duration determining means, means coupling said second pulse generating means to said pulse duration determining means to determine the duration of said pulses from said second generating means in proportion to the speed of said second member, means combining the pulses from said first and second pulse generating means to generate control pulses, speed-relation control means controlling the relative speed between said first and second members, and means coupling said combining means to said speed-relation control means to apply said control pulses to control the speed relation between said two members.

8. Apparatus according to claim 7, wherein said pulse duration determining means comprise a third pulse generating means coupled to said second member and generating count pulses at a repetition frequency proportional to the speed of said second member, and a pulse counter adjustable to count a desired number of said count pulses and to generate a signal at the end of said count, and means controlling said second pulse generating means by said signal to determine the other edge of the pulses from said second pulse generating means.

9. Apparatus according to claim 7, wherein the pulses from said first pulse generating means have a waveform consisting of positive and negative half-cycles of equal duration, said control pulse generating means being operative during one of said half-cycles to generate a control pulse, said apparatus including means rendering said control pulse operative during the next half-cycle to control said speed relation control means.

10. Apparatus according to claim 7, comprising two control channels coupling said combining means and said speed-relation control means, one of said channels including means generating a control pulse in response to a pulse of said second generating means of longer than a pulse from said first generating means, and the other of said channels including means generating a control pulse in response to a pulse of said second generating means of shorter duration than a pulse from said first generating means.

11. Apparatus according to claim 7 comprising a third pulse generating means coupled to said second member and generating count pulses at a repetition frequency proportional to the speed of said second member and much greater than the repetition frequencies of the pulses from said first and second pulse generating means, gating means, means coupling said third pulse generating means to said gating means, and means coupling said control pulse generating means to said gating means to apply said control pulses to open said gating means and permit said count pulses to pass therethrough during each said control pulse.

12. Apparatus according to claim 11 comprising integrating means coupled to the output of said gating means and generating a control voltage substantially proportional to the number of said count pulses applied thereto, and means to control said speed-relation control means in response to said control voltage.

References Cited in the file of this patent

UNITED STATES PATENTS

| | | |
|---|---|---|
| 2,537,427 | Seid et al. | Jan. 9, 1951 |
| 2,599,430 | Beuerman | June 3, 1952 |
| 2,692,361 | Asbury | Oct. 19, 1954 |